UNITED STATES PATENT OFFICE.

EDWARD W. HASLUP, OF BRONXVILLE, NEW YORK, ASSIGNOR TO ROBERT GILCHRIST, OF NEW YORK, N. Y.

PROCESS OF RECOVERING COMBINED NITROGEN FROM BLAST-FURNACES.

1,310,480.  Specification of Letters Patent.  Patented July 22, 1919.

No Drawing.  Application filed June 25, 1918. Serial No. 241,753.

*To all whom it may concern:*

Be it known that I, EDWARD W. HASLUP, a citizen of the United States, residing at Bronxville, in the county of Westchester and State of New York, have invented certain new and useful Improvements in Processes of Recovering Combined Nitrogen from Blast-Furnaces; and I do hereby declare the following to be a full, clear, and exact description of the invention, such as will enable others skilled in the art to which it appertains to make and use the same.

This invention relates to a process of recovering combined nitrogen from blast furnaces and has for its object to provide a method of separating out the nitrogen containing compounds from the other compounds present in the fumes, in a manner more efficient and more expeditious than those heretofore proposed.

With this and other objects in view the invention consists in the novel steps and combinations of steps constituting the process, all as will be more fully hereinafter described and particularly pointed out in the claims.

It has long been known that fumes leaving an iron blast furnace contain considerable quantities of cyanids and other nitrogen compounds, and I find that if these said furnace fumes are not permitted to leave the top of the stack, but are, on the contrary, tapped directly from the fusion zone of the furnace, there will be recovered along with other compounds not only the above mentioned cyanids, but also cyanamids of the alkali metal bases present in the charge.

Accordingly, in carrying out this invention, I withdraw the said fumes, along with the permanent gases, from a blast furnace at a point opposite the fusion zone, whereupon the fumes and gases are passed into a suitable condenser or separator, where the fumes are brought to the solid condition, and the permanent gases are allowed to pass out. The solids thus condensed and recovered are found to contain alkali metal carbonates, alkali metal cyanids, alkali metal cyanamids, alkali metal sulfids and other compounds not necessary to mention. Owing to the presence of the alkali metal sulfids in the condensed fumes it is difficult to recover the combined nitrogen compounds by direct methods, and therefore, I proceed to eliminate said sulfids. But, before the elimination of said sulfids, I first dissolve the mixture of solids in water in order to extract the soluble constituents consisting mainly of cyanids, cyanamids, sulfids and carbonates. I then filter the solution thus obtained to eliminate any insoluble compounds that may be present. In order to eliminate from the solution the cyanamids present, I pass the said solution into an autoclave containing steam at say 200 pounds pressure, and thus subject the said cyanamids to a corresponding temperature whereupon they immediately decompose into the corresponding alkali metal carbonates and into ammonia, in accordance with well known reactions.

The ammonia thus produced is recovered in any suitable manner as by passing the same through a solution containing sulfuric or nitric acid to form a corresponding salt, or it may be recovered in a gaseous form. The carbonates formed from the decomposition of the cyanamids go into solution and are added to the alkali metal carbonates, already present. The other constituents of the original filtered solution remain unchanged after the decomposition of said cyanamids, and in order to get rid of the alkali metal sulfids present, I may now add a sufficient quantity of magnesium hydrate to react with all the carbonates and sulfids present.

If we illustrate with potassium salts, the reaction, after the addition of the magnesium hydrate, will be in accordance with the following equation:—

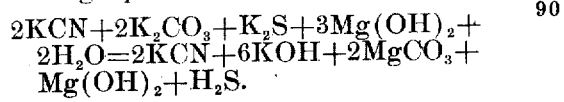

This mixture is brought to a boiling temperature, and an excess of magnesium hydrate is employed as indicated in order to drive off the hydrogen sulfid. If an excess of magnesium hydrate be not employed the hydrogen sulfid formed and in the presence of potassium hydrate will react to produce potassium sulfid. The resulting solution is now filtered to remove the magnesium carbonate formed, whereupon the filtrate may be concentrated to separate out the crystallizable cyanids from the alkali metal hydrates present which latter constitute a valuable by-product even though they be not commercially pure.

All of the nitrogen containing fume from an iron blast furnace which is ordinarily industrially worthless may be recovered in a commercially valuable form. That is to say, a crude cyanid from a blast furnace mixed with other compounds as is usually the case, is worthless for most uses to which a cyanid can be put. The fume itself cannot be used as a fertilizer at all, because, the cyanid present is poisonous to growing plants as well as to germinative processes.

It is obvious that those skilled in the art may vary the details of the process without departing from the spirit of the invention and therefore, I do not wish to be limited to the above disclosure except as may be required by the claims.

What I claim is:—

1. The process of recovering combined nitrogen from a blast furnace which consists in treating the furnace fumes with water to extract their soluble constituents; subjecting the solution thus produced to the action of an autoclave to convert any cyanamids present into ammonia and into carbonates; freeing the solution of any sulfids present; separating out any insoluble compounds that may be present after the sulfids are removed; and separating out the nitrogen compounds remaining in said solution, substantially as described.

2. The process of recovering combined nitrogen from a blast furnace which consists in treating the furnace fumes with water to extract their soluble constituents; filtering out any suspended material present; subjecting the solution thus produced to the action of an autoclave to convert any cyanamids present into ammonia and into carbonates; adding an excess of magnesium hydrate for the purpose of freeing the solution of any sulfids present; separating out any insoluble compounds that may be present after the sulfids are removed; and separating out the nitrogen compounds remaining in said solution, substantially as described.

3. The process of recovering combined nitrogen from a blast furnace which consists in tapping the furnace fumes from the fusion zone of the furnace; treating said fumes with water to extract their soluble constituents; subjecting the solution thus produced to the action of an autoclave to convert any cyanamids present into ammonia and into carbonates; adding magnesium hydroxid in excess for the purpose of freeing the solution of any sulfids present; separating out any insoluble compounds that may be present after the sulfids are removed; and separating out the nitrogen compounds remaining in said solution, substantially as described.

In testimony whereof I affix my signature, in presence of two witnesses.

EDWARD W. HASLUP.

Witnesses:
LESTER H. WASHBURN,
W. HENRY HOYT.

Copies of this patent may be obtained for five cents each, by addressing the "Commissioner of Patents, Washington, D. C."